US008279349B2

(12) United States Patent
Shmueli et al.

(10) Patent No.: US 8,279,349 B2
(45) Date of Patent: Oct. 2, 2012

(54) AUTOMATIC CONTROL OF VISUAL PARAMETERS IN VIDEO PROCESSING

(75) Inventors: Yaron Shmueli, Kfar-Saba (IL); Eran Gonen, Herzlia (IL); Amotz Hoshen, Ramat Gan (IL)

(73) Assignee: Nice Systems Ltd., Ra'anana (IL)

( * ) Notice: Subject to any disclaimer, the term of this patent is extended or adjusted under 35 U.S.C. 154(b) by 508 days.

(21) Appl. No.: 12/619,695

(22) Filed: Nov. 17, 2009

(65) Prior Publication Data

US 2011/0115980 A1 May 19, 2011

(51) Int. Cl.
*H04N 9/68* (2006.01)
(52) U.S. Cl. ........ 348/645; 348/254; 348/750; 348/447; 382/167; 382/172; 382/274
(58) Field of Classification Search .................. 348/645, 348/254, 750; 382/167, 172, 274
See application file for complete search history.

(56) References Cited

U.S. PATENT DOCUMENTS

| 7,990,443 | B2* | 8/2011 | Katagiri et al. | 348/254 |
|---|---|---|---|---|
| 2002/0145678 | A1* | 10/2002 | Suzuki et al. | 348/675 |
| 2006/0245637 | A1* | 11/2006 | Prince | 382/150 |
| 2007/0237514 | A1* | 10/2007 | Pillman et al. | 396/153 |
| 2008/0037897 | A1* | 2/2008 | Chiang et al. | 382/273 |
| 2008/0056704 | A1* | 3/2008 | Ovsiannikov | 396/234 |
| 2008/0100743 | A1* | 5/2008 | Cho et al. | 348/447 |
| 2008/0267498 | A1* | 10/2008 | Shaw et al. | 382/173 |
| 2008/0292185 | A1* | 11/2008 | Kimura et al. | 382/172 |
| 2009/0002563 | A1* | 1/2009 | Barnhoefer et al. | 348/673 |
| 2009/0052774 | A1* | 2/2009 | Yoshii et al. | 382/167 |
| 2009/0091660 | A1* | 4/2009 | Wang et al. | 348/649 |
| 2009/0167751 | A1* | 7/2009 | Kerofsky | 345/214 |
| 2009/0167789 | A1* | 7/2009 | Kerofsky | 345/690 |
| 2009/0267876 | A1* | 10/2009 | Kerofsky | 345/87 |
| 2010/0302405 | A1* | 12/2010 | Katagiri et al. | 348/222.1 |

* cited by examiner

*Primary Examiner* — Jefferey Harold
*Assistant Examiner* — Sam Huang
(74) *Attorney, Agent, or Firm* — Pearl Cohen Zedek Latzer, LLP

(57) ABSTRACT

Embodiments of the invention are directed to a system and method for controlling visual parameters of a capturing device to minimize clipping and saturation according to pre-defined parameters. The method may include processing pixel values of a current input frame of a received video signal captured by a capturing device; accumulating processing results of the current input frame to processing results of one or more previous input frames and calculating a desired dynamic range based on pre-determined user parameters. The processing may further include checking if the accumulated results are within the desired dynamic range and determining if adjustment is desired. If the accumulated results are not within the desired dynamic range, adjusting visual parameters for a subsequent input frame, by controlling the capturing device and if the accumulated results are within the desired dynamic range maintaining current visual parameters of the current input frame for the subsequent input frame.

12 Claims, 7 Drawing Sheets

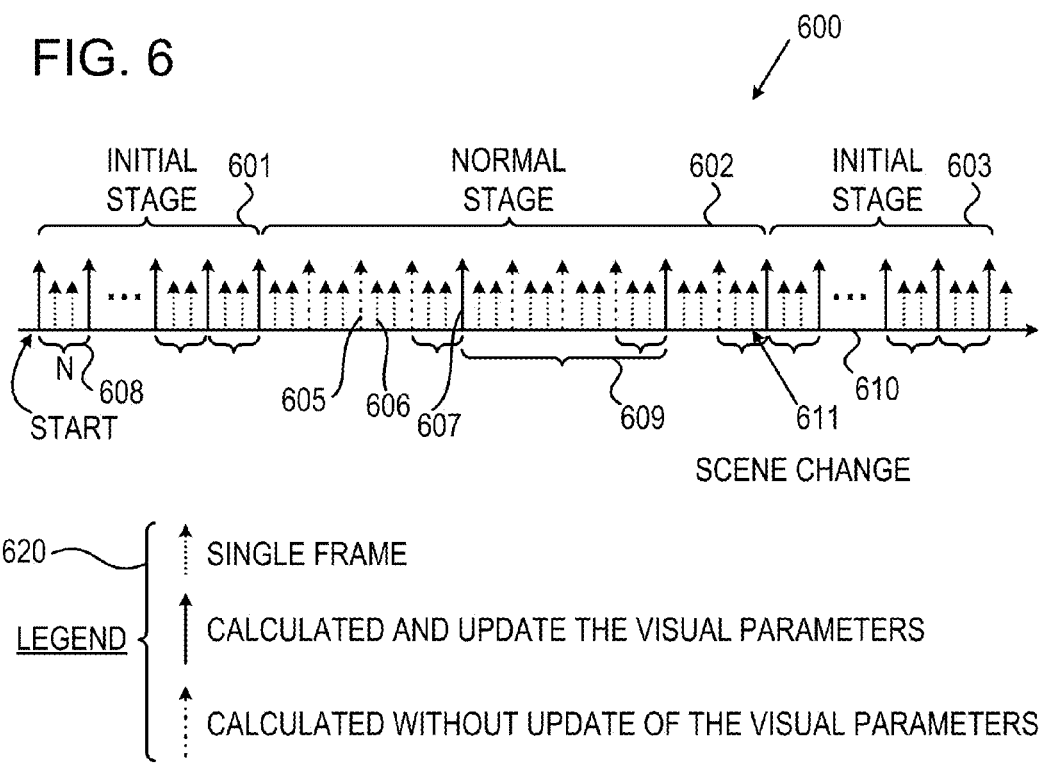
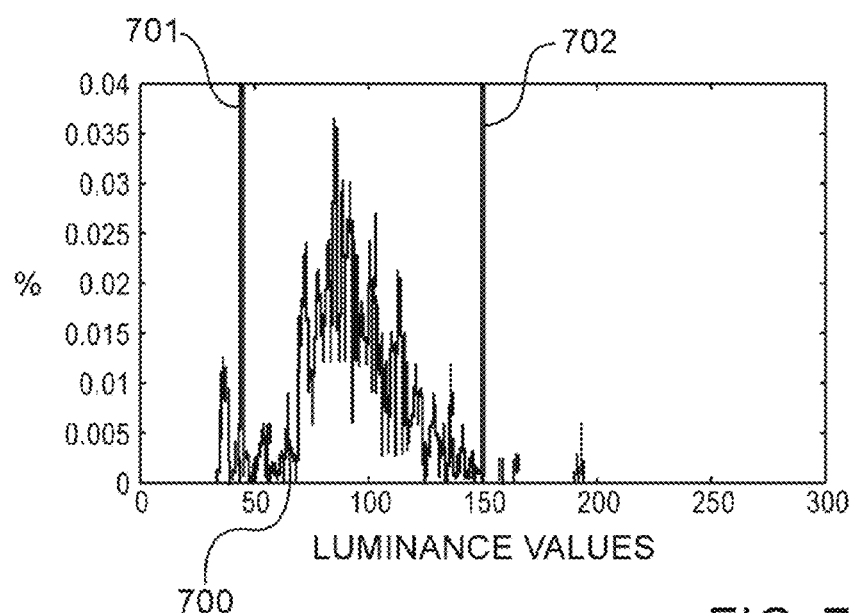

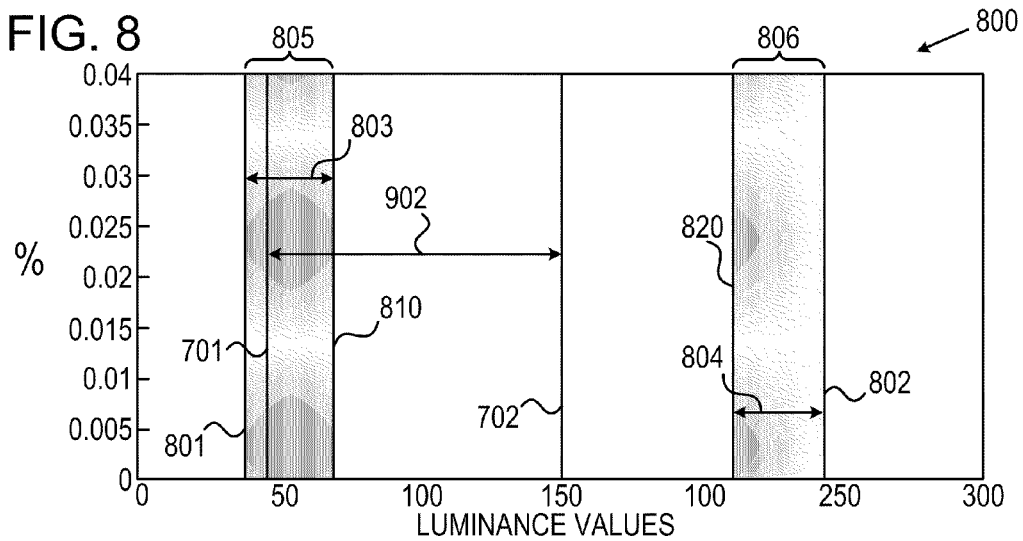
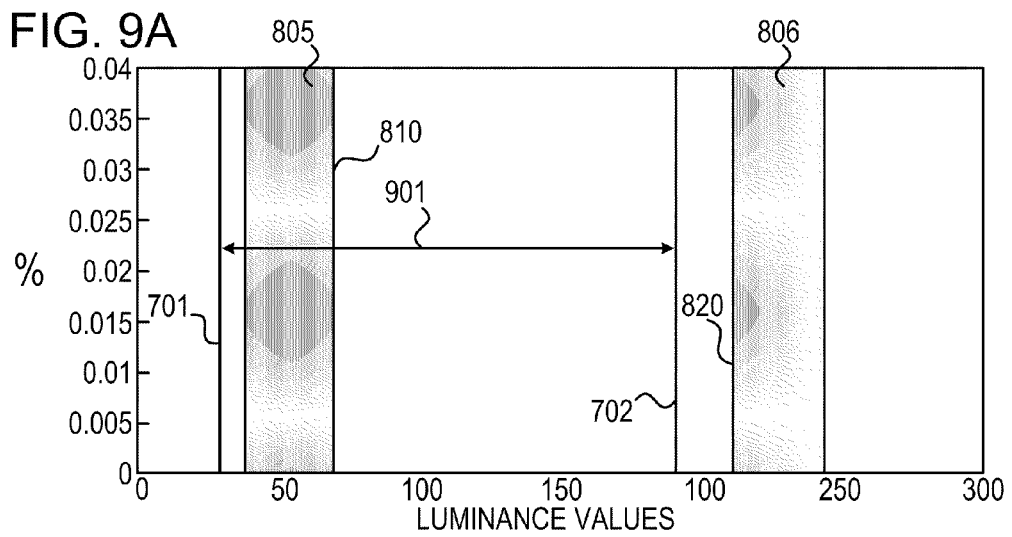
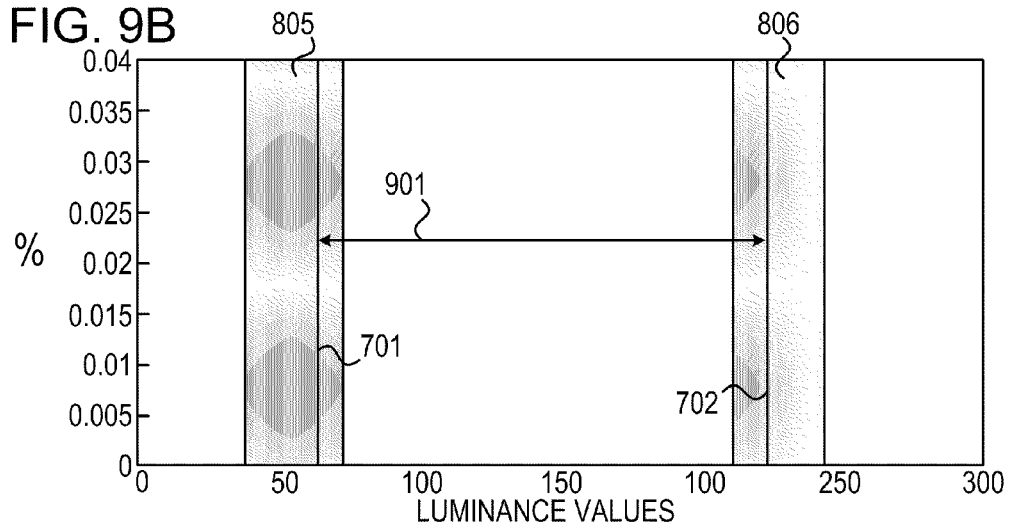

AUTOMATIC CONTROL OF VISUAL PARAMETERS IN VIDEO PROCESSING

BACKGROUND

Digital video processing is commonly used in a variety of implementations, such as broadcasting, streaming and storage. Video coding techniques usually require capturing of analog video signals and converting the analog signals to digital signals by analog-to-digital converters, sensors or other capturing devices. While the human sight has a very high dynamic range, capturing devices may usually have a more limited dynamic range. In practice, it is difficult to achieve the full dynamic range experienced by the human eye using electronic equipment.

Digital processing and bit manipulation methods may be used to achieve a high quality video with the limited dynamic range.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

FIG. 6 is a timing diagram of received flames and updating of visual parameters according to embodiments of the present invention;

FIG. 7 is an exemplary accumulated histogram including minimum and maximum clipping thresholds illustrating embodiments of the present invention;

FIG. 8 is an exemplary diagram illustrating thresholds, a dynamic range and sensitivities areas according to embodiments of the present invention;

FIGS. 9A and 9B are exemplary diagrams illustrating the effect of increasing a contrast parameter and a brightness parameter on clipping thresholds according to embodiments of the present invention;

Figure 1:
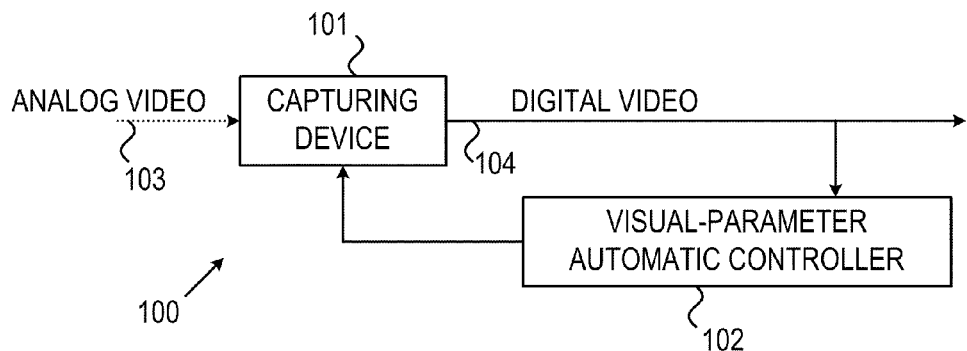
FIG. 1 is a high-level block diagram of an exemplary system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device such as a digital signal processor (DSP), an application-specific integrated circuit (ASIC) or a field-programmable gate array (FPGA) and the like that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Embodiments of the invention may enable optimization of visual clarity of a video signal that mimic the subjective view a Human Visual System (HVS) perceives a scene. Embodiments of the invention may control the process of capturing a video signal by a capturing device by analyzing a captured frame and changing visual parameters of the capturing device by a feedback process based on the analysis of the captured frame. Embodiments of the invention may include adjustment of visual parameters of the capturing device to improve the capturing process of the following captured frame. Adjusting the visual parameters of the capturing device may enable control of the dynamic range and enhancement of the frame by capturing new information in the flame acquiring process.

Embodiments of the invention may include processing pixel values of a current input frame of a received video signal and accumulating the processing results of the current input flame to processing results of previous input flames. Embodiments of the invention may further include calculating a desired dynamic range based on pre-determined user parameters; checking if the accumulated results are within the desired dynamic range; adjusting visual parameters of a following input frame, if the accumulated results are not within the desired dynamic range; or maintaining the values of visual parameters of the current input for the following input frame, if the accumulated results are within the desired dynamic range.

Reference is now made to FIG. 1, which is a high-level block diagram of an exemplary system according to embodiments of the present invention. An exemplary system 100 may comprise a capturing device 101 connected or coupled to a visual-parameter automatic controller 102. Capturing device 101 may receive an analog video signal 103 as an input and may convert the analog signal 103 to a discrete digital video signal 104, e.g., by sampling analog video signal 103. The term "capturing device" refers herein to any device which converts continuous signals to discrete digital numbers. For example, capturing device 101 may include an analog-to-digital converter (ADC) which may convert an input analog voltage (or current) to a digital number proportional to the magnitude of the voltage or current. Capturing device 101 may include a sensor, such as a Charge-Coupled Device (CCD) or a Complementary metal-oxide-semiconductor (CMOS) which may capture or photograph the real world into digital video 104.

Visual-parameter automatic (VPA) controller 102 may receive digital signal 104 and may analyze the samples of the signal by determining a desired or optimal dynamic range of the signal so as to minimize loss of details visible to the human eye. The term "dynamic range" as used throughout the specification and claims may describe a ratio between the smallest and largest possible values of a quantity of light captured by a capturing device. VPA controller 102 may control the visual parameters of capturing device 101 by re-setting or adjusting the visual parameters. Non-exhaustive examples of such visual parameters may include, for example, brightness, contrast and color parameters. VPA controller 102 may transfer configuration recommendations for capturing device 101 as to how to adjust visual parameters to reduce clipping and saturation in the next captured frames based on calculations performed on a current frame as detailed herein.

Figure 2:
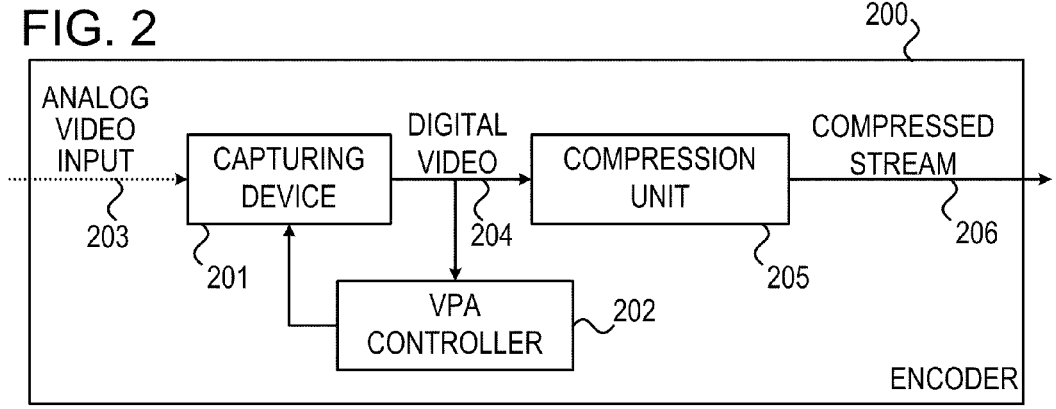
FIG. 2 is a block diagram of an exemplary local implementation of a system according to embodiments of the present invention.

Reference is now made to FIG. 2, which is a block diagram of an exemplary local implementation of an encoding system according to embodiments of the present invention. An exemplary encoder 200 may include a capturing device 201, a visual-parameter automatic (VPA) controller 202 and a compression unit 205. Encoder 200 may be implemented, for example, in camcorders, Internet Protocol (IP) cameras, or digital video recorders. In some embodiments, capturing device 201 may be a device, such as a video sensor, a CCD or a CMOS which may capture light photons and represent them as digital data, such as digital video signal 204. In other embodiments, capturing device 201 may be a device, such as an ADC which may receive an analog video signal 203 and convert it to digital data, such as digital video signal 204. VPA controller 202 may receive and analyze the digital signal so as to minimize clipping and saturation of the captured digital signal 204 and to enhance details in the video signal.

VPA controller 202 may adjust the visual parameters and control the visual parameters of future video frames captured by capturing device 201 VPA controller 202 may determine, according to characteristics of the video signal, how to set the visual parameters and may then send the visual parameters as feedback control commands to capturing device 201 for future captured video frames. The updated visual parameters may improve the visual clarity and the dynamic range of output digital video signal 204. Compression unit 205 may receive digital video signal 204 and may process it, for example, compressed the digital signal, and may output or deliver a compressed output video signal 206 to other elements, devices or modules such as storage, or viewing devices. Encoder 200 may deliver the compressed stream 206 to a communication network and may actually be used as a capturing device.

It should be understood to a person skilled in the art that the local implementation of encoder 200 presented in FIG. 2 is merely an exemplary local implementation and any other device, apparatus, machine or system which may include both a capturing device or element and a VPA controller that controls the settings of visual parameters of the capturing element may be used.

Figure 3:
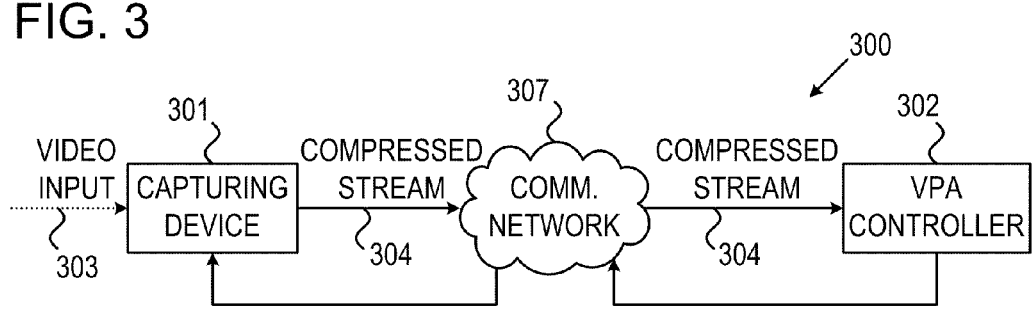
FIG. 3 is a block diagram of an exemplary remote implementation of a system according to embodiments of the present invention.

Reference is now made to FIG. 3, which is a block diagram of an exemplary remote implementation according of a system to embodiments of the present invention. An exemplary system 300 may be a surveillance system including cameras, communication equipment and display devices. System 300 may include a capturing device 301 and a VPA controller 302 coupled to each other via a communication network 307. Capturing device 301 may be any suitable device, such as an IP camera, a network encoder or the like. According to some embodiments of the invention, capturing device 301, e.g., an IP camera may include a video sensor, such as a CCD or a CMOS which may capture and output a digital video signal while in other embodiments capturing device 301 may capture analog video and convert it to digital video signals. Capturing device 301 may further include a compression device (not shown) to compress the digital video signal and to stream a compressed video stream 304 to communication network 307, for example, an Ethernet network.

VPA controller 302 may be embedded in a network video recorder (NVR), streaming server or other video device. VPA controller 302 may include or may be coupled to a decoding device (not shown) able to receive and decompress compressed video stream 304 and to transfer the raw digital video stream to VPA controller 302 VPA controller 302 may analyze the digital video frames as described in detail in embodiments of the invention and may send a feedback command via communication network 307 to capturing device 301. The command may change, update or set the visual parameters of the following frames captured by capturing device 301 by optimizing the dynamic range of the captured video signal, for example, the control over visual parameters may be done internally on the CMOS/CCD controller or analog-to-digital converter.

It should be understood to a person skilled in the art that the remote implementation of system 300 presented in FIG. 3 is merely an example for a remote implementation and any other system which may include a capturing element and a VPA controller connected via a communication network may be used. For example, VPA controller may be implemented as a software service included in a remote server and the like. Other embodiments may include other method of remote controlling of a capturing device, e.g., a camera or an ADC, as long as the capturing device allows a remote visual parameters adjustments.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

As the human sight has a very high dynamic range, it is difficult to achieve the full dynamic range experienced by a HVS using electronic equipment. A video capturing device, for example, capturing device 101 of FIG. 1 and a display device may have limited dynamic ranges. The resolution of a capturing device may indicate the number of discrete values such a device may produce over the range of analog values. The values may be usually stored electronically in a binary form, so the resolution may usually be expressed in bits. As a consequence, the number of discrete values available also referred to herein as "levels" may be defined as a power of two. For example, an ADC with a resolution of 8 bits may encode an analog input to one in 256 different levels, since $2^8=256$. The values may represent the range from 0 to 255

For example, a capturing device may sample 256-1024 levels, while real world scenes may contain several more levels. This may cause the phenomena of "saturation", which describes a situation of mapping high values of a dynamic range to the same maximum captured level, or "clipping", which describes a situation of mapping low values of a dynamic range to the same minimum captured level.

Changes in the scene environment may influence the captured video signal. The scene environment characteristics may be influenced by light changes, weather conditions and the like. Such changes may determine the dynamic range of the scene and may influence the details and the way the human visual system (HVS) perceived the digital samples.

Figure 4:
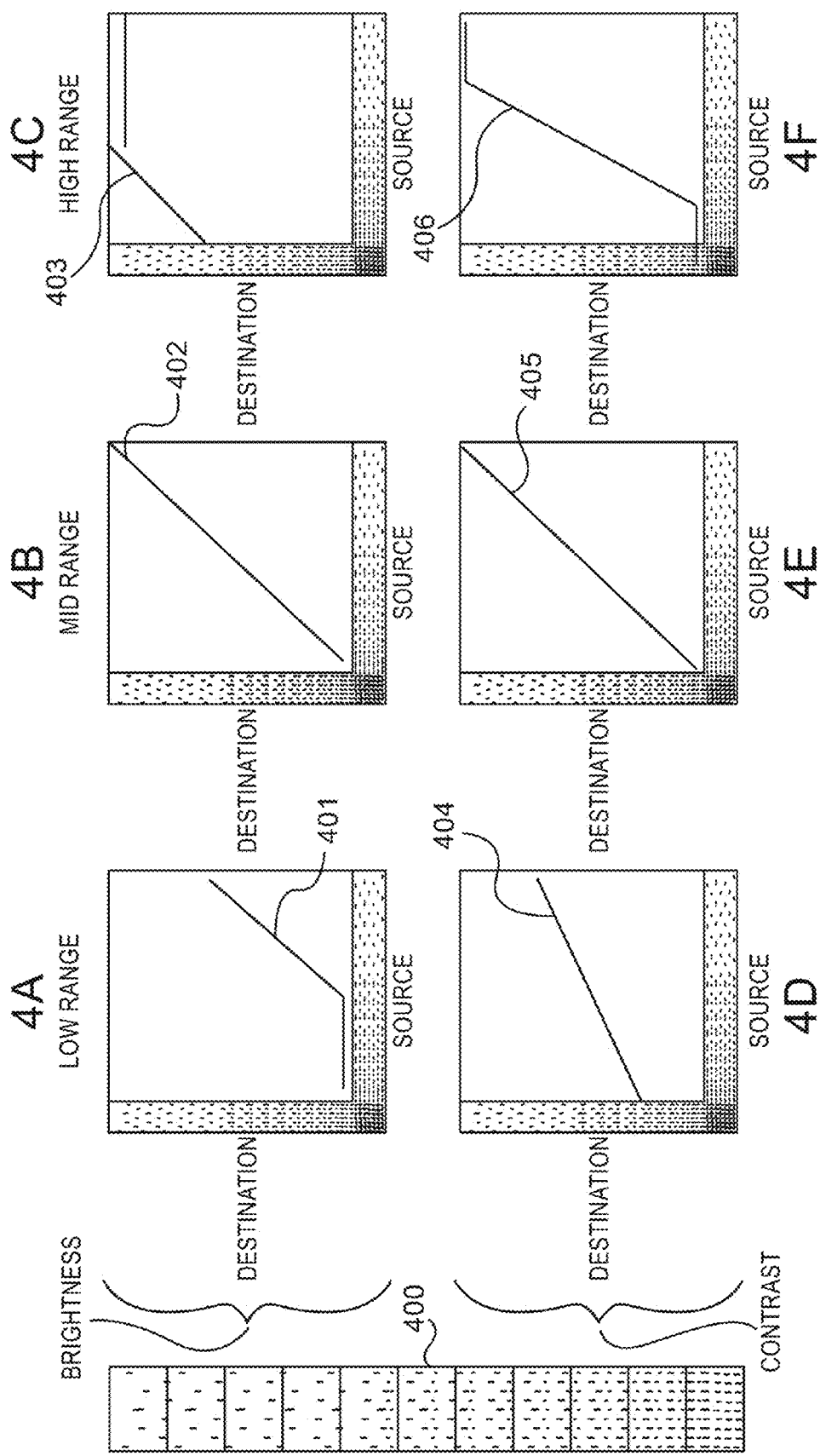
FIG. 4 shows six exemplary graphs illustrating the effect of visual parameters on the luma component in a video signal in accordance with embodiments of the present invention.

Reference is now made to FIG. 4 showing six exemplary graphs illustrating the effect of visual parameters on the luma component in a video signal in accordance with embodiments of the present invention. The X-axis of the graphs represents luma values of pixels in an input frame and the Y-axis represents luma (luminance) values of pixels in an output frame as a result of a visual parameter. Scale 400 represents in detail the luma values.

Boxes 4A-4C show the effect of the brightness parameter on the dynamic range of the luminance component. Box 4A represents the influence of a low range of brightness parameter levels on luminance values of pixels in a frame. As shown by graph 401, low range values are characterized by the clipping effect, namely, not mapping every input values to its respective identical output value, e.g., dark pixels are mapped to a single value (black), while higher pixel values are linearly mapped to lower pixel values in the output frame than the original values in an input frame. Box 4B represents the influence of median range of brightness parameter levels on luminance values of pixels in a frame. As shown by graph 402, median range values are characterized by mapping all outputs values to a same input values, e.g., pixels of an input frame are linearly mapped to substantially identical pixel values in an output frame. Box 4C represents the influence of high range of brightness parameter levels on luminance values of pixels in a frame. As shown by graph 403, high range values are characterized by the saturation effect, namely, not mapping every input value to its respective identical output value, e.g., high pixel values, namely light pixels are mapped to a single value (white), while lower pixel values are linearly mapped to higher pixel values in the output frame than the original values in an input frame. As is shown by boxes 4A-4C, lowering the graph by reducing the brightness may cause clipping and elevating the graph by increasing the brightness may cause saturation. There may be loss of information due to clipping or saturation. Such a loss may be related to from one pixel level to all pixel levels depending on the value of brightness or contrast.

Boxes 4D-4F show the effect of the contrast parameter on the dynamic range of the luminance component. Box 4D represents the influence of low range of contrast parameter levels on luminance values of pixels in a frame. As shown by graph 404, low range values are characterized by mapping the entire range of pixel values in the input frame to a narrower range of pixel values in the output frame. Box 4E represents the influence of median range of contrast parameter levels on luminance values of pixels in a flame. As shown by graph 405, median range values are characterized by an exact mapping of output values to input values, e.g., pixel values in an input frame are linearly mapped to substantially identical pixel values in an output frame. Box 4F represents the influence of high range of contrast parameter levels on luminance values of pixels in a frame. As shown by graph 406, high range values are characterized by contrast values that map part of the input range to the whole output range of values, e.g., a narrow range of pixel values in the input frame is mapped to a wider range of pixel values in the output frame. Using the influence or effect of the visual parameters such as, for example, brightness and contrast, embodiments of the invention may enable automatically changing of the dynamic range and improving the way we perceived the video frames, e.g., presenting more details by reducing saturation and clipping.

It should be understood to a person skilled in the art that color may be handled similarly to luminance on chrominance levels (for brightness parameters). Although the graphs presented in FIG. 4 have linear characteristics, the invention is not limited in this respect and other graph characteristics, for example, non-linear characteristics may be used. It should be further understood to a person skilled in the art that the graphs are merely demonstrative examples, since visual parameters are specific for a capturing device. The values of low, median and high parameters values cannot be specified by absolute values.

Figure 5:
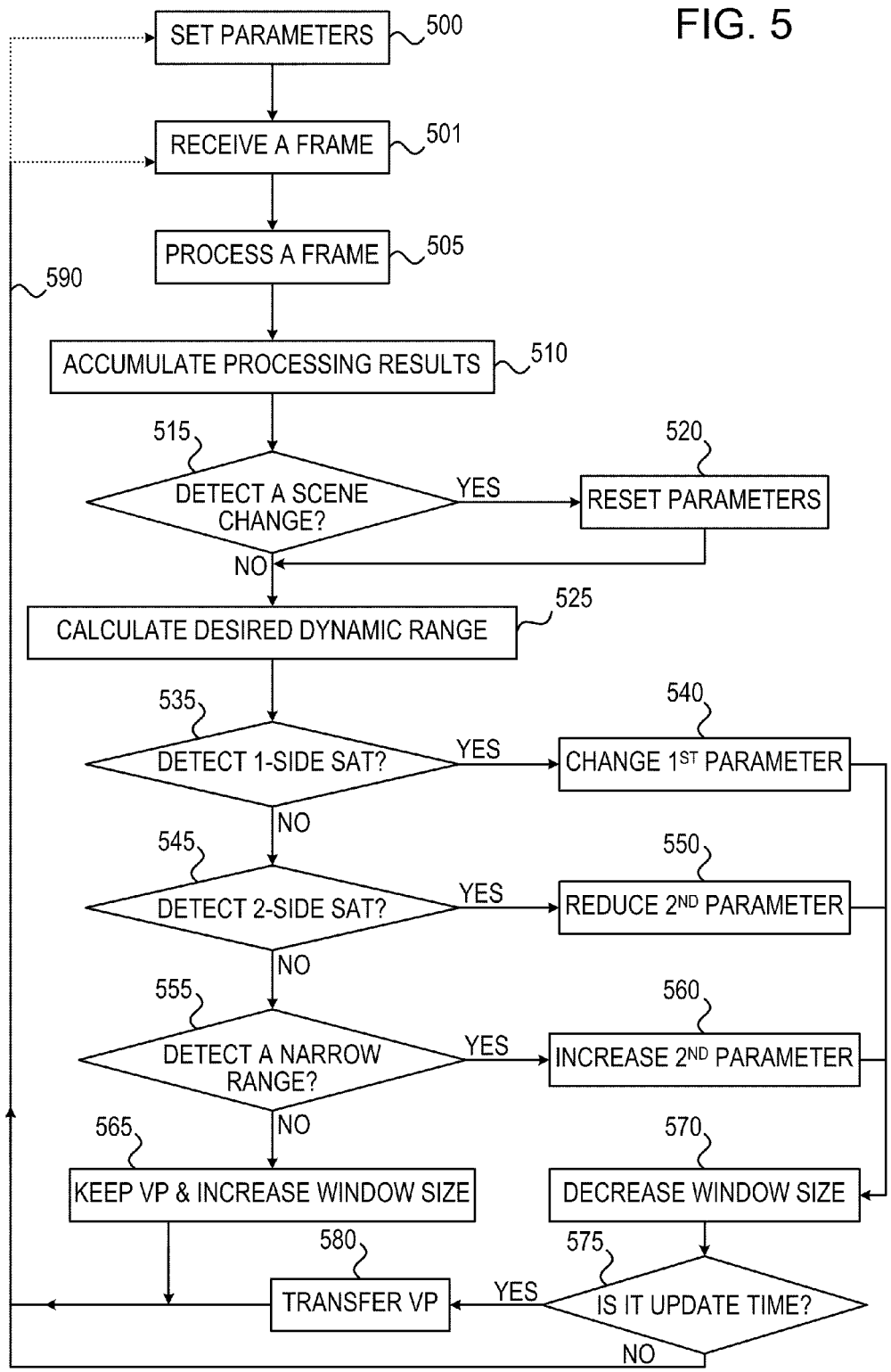
FIG. 5 is a high-level flowchart describing a method for controlling visual parameters according to embodiments of the present invention.

Reference is now made to FIG. 5, which is a high level flowchart demonstrating a method for controlling visual parameters according to embodiments of the present invention. Operations of the method may be implemented by, for example, VPA controller 102 of FIG. 1, VPA controller 202 of FIG. 2, VPA controller 302 of FIG. 3 and/or by other suitable units, devices, and/or systems.

As indicated at box 500, the method may include setting parameters and user preferences. In some embodiments of the invention, the initial parameters and user preferences may be set once, prior to the process of controlling visual parameters, e.g., not in real-time, or at the beginning of the process of controlling visual parameters, while in other embodiments, the initial parameters and user preferences may be set or changed during the process of controlling visual parameters, e.g., in real time. Settings of parameters and other user preferences may be performed once before the actual video processing and controlling of visual parameters is started. User preferences may define the desired dynamic range which may be considered best for a certain user and may depend on how a real scene may be perceived by the user. User preferences may be specific to scene characteristics, indoor scene or outdoor scene and the like. User preferences may also be specific to a certain application, e.g., medical application or surveillance application, a specific video compression standard, e.g., MPEG-2, MPEG-4, H 264 or JPEG or may be specific to a display device or encoder. Any other parameters may be taken into consideration while settings user preferences.

The initial parameters and user preferences may set the minimum and maximum threshold values of the desired dynamic range. For example, the minimum and maximum thresholds values, when being calculated on histograms, may set the amount of pixels below the minimum luminance level and the amount of pixels above the maximum luminance level. The thresholds may enable a user to set a preference according to his decision, for example, to choose darker or lighter results, namely to focus on dark or light details in the video frame. For example, for dark preference the visual parameters may be aimed to low levels of the dynamic range and for lighter preference the visual parameters may be aimed to high levels of the dynamic range.

As indicated at box 501, the method may include receiving a frame of a video signal by one or more capturing devices or frame detectors, for example, by capturing device 101 of FIG. 1. The method may further include converting the received analog signal to digital signal and saving the received frame of the video signal in a dedicated memory or storage unit.

As indicated at box 505, the method may include processing a bitmap of an input frame, a region of interest (ROI) or an area of interest (AOI) of a current input frame. The processing may include performing mathematical calculations of pixel values of the current input flame or on specific area of the frame. For example, processing may include generating an histogram for the entire video frame, for a ROI or an AOI of the frame. A general histogram equation is presented in equation 1:

$$n = \sum_{j=0}^{k} m_j \quad [1]$$

where n represents the total number of pixels in a frame, k represents the total number of bins, i.e., luminance or color level and $m_j$ represents the bin size, i.e. the number of pixels with luminance or color value of j. It should be understood to a person skilled in the art that the use of histograms is an exemplary method of handling processing results and it does not limit the scope of the invention as any other way, method, technique or model may be used to handle, analyze or use mathematical results and values.

According to embodiments of the invention, the mathematical calculations may be performed on every predefined number of received frames. A parameter defining a number of N frames, also referred to herein as "a window" may be defined upon setting the initial parameters. Parameter N may define the algorithm or method for performance load balancing, namely, the number of frames which are not being processed before performing the mathematical calculations as described in details with reference to FIG. 6.

Reference is made now additionally to FIG. 6, which is a timing diagram according to embodiments of the present invention. Timing diagram 600 may include a sequence of three types of arrows illustrated on a time axis 610 and defined in legend 620. Each of the arrows, for example, each of arrows 605, 606 and 607, represents a single frame received by a capturing device.

As shown by legend 620, a small dotted arrow, e.g., arrow 606 represents a received frame and a large dashed-dotted arrow, e.g., arrow 605 represents a frame on which a processing or mathematical calculation is performed and no updating of visual parameters is performed (the process of updating visual parameters is described with reference to boxes 575 and 580 of FIG. 5). A large full arrow, e.g., arrow 607, represents a frame on which a processing or mathematical calculation is performed and updating of visual parameters is performed.

A mathematical calculation may be performed for large dashed-dotted arrows and full arrows, namely, every N frames as shown, for example, by group 608 of N=3 frames in timing diagram 600. Another parameter defined, for example, at box 500 is a parameter P which represent a multiplicand of N, namely when a window of P*N flames is required.

Timing diagram 600 may include one or more initial stage ranges, fox example, ranges 601 and 603, and one or more normal stage ranges, for example, range 602. An initial stage range may be set, for example, during the beginning of operation of a system having a VPA controller or after a scene changed had been detected (as indicated at box 515 of FIG. 5). During an initial stage range a convergence to an optimal video clarity may happen faster than during normal stage range due to fewer changes between flames. Therefore during initial stage range, e.g. range 601, the frequency of updating visual parameters may be performed every N frames which is also the averaging window of the histogram. During a normal stage range, e.g. range 602, the calculation may be performed at the same frequency as in the initial stage range, e.g., every N flames, but the frequency of updating the visual parameters may be different, e.g., every P windows of N, namely, every N*P frames as represented by 609.

Reference is made back to FIG. 5. As indicated at box 510, the method may include accumulating processing results of a current input frame to processing results of previous input flames in order to average or smooth sharp transients or changes in scene characteristics, for example, dramatic changes in light such as turning lights on and off, clouds covering the sky and the like. Accumulating processing results may include, for example, accumulating the histogram calculated for the current flame, AOI or ROI to the histograms previously calculated for previous flames, AOI's or ROI's. Accumulating processing results may further include calculating, based on the accumulated results, a calculated low clipping threshold and a calculated high saturation threshold, both may be calculated based on user preferences defining the percentage of the upper and lower luminance levels that may be cut out of the processing results, e.g., from the accumulated histogram as further described with reference to FIG. 7.

As indicated at box 515, the method may include detecting a scene change or determining whether a scene had changed between the current frame and previous frame. A scene change detection may be used for detecting a sharp transient change in the scene, e.g., in the histogram characteristics. The determination regarding a scene change may be performed by comparing a current frame to a previous frame. This may be performed, for example, by comparing a histogram calculated for a current flame to a histogram calculated for a previous frame or to the accumulated histogram, which is an average histogram of a plurality of previous flames.

The comparison of the current frame to the previous frame may be performed by, for example, comparing the histogram of a current frame and a previous frame to a predefined threshold parameter, e.g., a parameter defined at box 500. Such a comparison may include subtracting histogram's bins of a current frame from the histogram's bins of a previous flame, the histogram's bins may represent the sum of pixels with the same value for each luminance or color range, e.g., from 0 to 255 or generally all over the dynamic range, calculating the absolute value of the subtraction result, namely absolute difference between a current frame histogram and a previous frame histogram, summing the differences for all pixel values and normalizing the result with respect to the total number of pixels in a frame and compare the normalized value to a predefined threshold parameter. If a scene change had been detected, according to embodiments of the invention a plurality of timing and frames parameters are reset (box 520).

As indicated at box 520, the method may include performing a reset operation for a plurality of timing parameters and frame parameters, namely, initializing a plurality of parameters and values by using their default value, e.g., the values given at box 500. In case a scene had changed, the accumulated results or accumulated histogram may be no longer effective and therefore the current frame may take the role of the accumulated histogram. In addition, other timing parameters may be updated, for example, parameter N may receive its default, predefined value, e.g., the initial value defined at box 500 and parameter P may receive the default value of 1.

As indicated at box 525, after performing the reset operation and also if a scene change had not been detected, the method may include calculating a desired dynamic range. Calculating the desired dynamic range may be based on user preferences and user pre-determined parameters (determined, for example at box 500). Calculating the desired dynamic range may be performed at any earlier stage of performing the method. Calculating the desired dynamic range may include calculating a low sensitivity area and a high sensitivity area and may be based on predetermined parameters which may include calculating minimum value of the desired dynamic range, the maximum value of the desired dynamic range and width parameters for sensitivities areas values, also known as sensitivity or robustness to changes as further described with reference to FIG. 8. For example, small width may be more sensitive since for small changes in histogram visual parameters may be updated more frequently while large width may be less sensitive since small changes may be included in the large width and no visual parameters update may be required. According to embodiments of the invention, the calculation operation of box 525 may be performed at an earlier stage of performing the method. It should be understood to a person skilled in the art that the location of box 525 is merely an example, since calculating the desired dynamic range is based on predetermined parameters.

Reference is made now to FIG. 7 which is an exemplary accumulated histogram including a calculated low-clipping threshold and a calculated high-clipping threshold illustrating embodiments of the present invention. Histogram 700 represents an exemplary accumulated histogram based on processing results calculated, for example at box 510. Calculated low-clipping threshold 701 may be calculated according to a predefined parameter that set a percentage of the lower luminance levels that may be cut out from the dynamic range, e.g., 2% from the lower luminance levels which equals 46. Calculated high-saturation threshold 702 may be calculated according to a predefined parameter that set a percentage of the higher luminance levels that may be cut out from the dynamic range, e.g., 2% from the higher luminance levels which equals 150.

Reference is additionally made to FIG. 8 which is an exemplary diagram illustrating thresholds, a desired dynamic range and sensitivities areas according to embodiments of the present invention. A plurality of areas and ranges may be defined or calculated by, for example, the following parameters which may be set and predefined by a user or a system administrator. A minimum value of a desired dynamic range 801 and a maximum value of a desired dynamic range 802 and in addition low sensitivity area width 803 and high sensitivity area width 804 may result in defining a maximum value of the low sensitivity area 810 and a minimum value of the high sensitivity area 820. Although the present invention is not limited in this respect, the high and low range widths may be identical or different from one another. Two sensitivity areas, low sensitivity area 805 and high sensitivity area 806 may be defined based on the parameters. A minimum desired dynamic range value is defined as the distance between 810 and 820, namely, the area between low sensitivity area 805 and high sensitivity area 806 not including the area of the sensitivities areas. The maximum desired dynamic range value is defined as the distance between 801 and 802, namely, the area between low sensitivity area 805 and high sensitivity area 806 including the area of the sensitivities areas Reference is made back to FIG. 5. As indicated at boxes 535, 545 and 555, the method may include checking if the accumulated results are within the desired dynamic range, calculated at box 525. Checking may include determining, as shown for example in FIG. 8, if the calculated low and high clipping thresholds, for example, thresholds 701 and 702, are located inside or outside of the low sensitivity area 805 and the high sensitivity area 806, respectively. Checking may include identifying the location of the calculated low-clipping threshold 701 relative to the desired low sensitivity area 805 and the location of the calculated high-saturation threshold 702 relative to the desired high sensitivity range area 806 as described in detail at boxes 535, 545 and 555.

As indicated at box 535, the method may include detecting one-side saturation, namely, if the low-clipping threshold calculated on the accumulated results (701 of FIG. 8) is lower than the minimum value of the desired sensitivity area (801 of FIG. 8) or if the high-saturation threshold calculated on the accumulated results (702 of FIG. 8) is higher than the maximum value of the desired sensitivity area (802 of FIG. 8).

For example, with reference to FIG. 8, the calculated low-clipping threshold 701 which is calculated with relation to the accumulated histogram shown in FIG. 7, is located inside low sensitivity area 805 and therefore no saturation is detected. Calculated high-saturation threshold 702 which as well is calculated with relation to the accumulated histogram shown in FIG. 7, is not higher than the maximum value of the sensitivity area 802, therefore no situation of one-side saturation is detected at FIG. 8.

As indicated at box 540, if one-side saturation is detected, the method may include adjusting, changing or updating a first predetermined visual parameter, for example, the brightness parameter.

Increasing the brightness parameter may shift the accumulated histogram towards higher values which may lead to shift in the location of the calculated clipping thresholds to higher values. Increasing the brightness parameter after one or more iterations may shift the clipping thresholds into the desired sensitivity area as required and shown by FIGS. 9A and 9B. Increasing the brightness parameter may be performed when one of the clipping thresholds located in a lower luminance value than its respective sensitivity area. Increasing the brightness parameter may shift the accumulated histogram towards higher values leading to shifting of the calculated clipping thresholds to higher values.

Decreasing the brightness parameter may shift the accumulated histogram towards lower values which may lead to shift in the location of the calculated clipping thresholds to lower values. Decreasing the brightness parameter after one or more iterations may shift the clipping thresholds into the sensitivity area as required. Decreasing the brightness parameter may be performed when one of the clipping thresholds located in a higher luminance value than its respective sensitivity area. Decreasing the brightness parameter may shift the accumulated histogram towards lower values leading to shifting of the calculated clipping thresholds to lower values.

Reference is made back to FIG. 5, as indicated at box 545, if one-side saturation is not detected, the method may include detecting two-side saturation, namely, if both the low-clipping threshold calculated on the accumulated results (701 of FIG. 8) is lower than the minimum value of the desired sensitivity area (801 of FIG. 8) and the high-saturation threshold calculated on the accumulated results (702 of FIG. 8) is higher than the maximum value of the desired sensitivity area (802 of FIG. 8).

As indicated at box 550, if two-side saturation is detected, the method may include changing or updating a second predetermined visual parameter. For example, the method may include reducing of the contrast parameter.

As indicated at box 555, if no saturation is detected at boxes 535 and 545, the method may include detecting a situation of no saturation and a narrow dynamic range, namely, at least one of the clipping thresholds is located between low desired sensitivity area (805 of FIG. 8) and high desired sensitivity area (806 of FIG. 8), excluding areas 805 and 806.

As indicated at box 560, if a narrow dynamic range is detected, the method may include changing or updating a second predetermined visual parameter. For example, the method may include increasing of the contrast parameter.

Reference is made now to FIGS. 9A and 9B, which are exemplary diagrams illustrating the effect of increasing a contrast parameter and a brightness parameter on clipping thresholds according to embodiments of the present invention. With relation to FIG. 8, in order to improve a frame perception by a user, visual parameters may be updated in order to shift threshold 702 into high desired sensitivity area 806. Such an effect may be performed by a plurality of iterations of updating and modifying visual parameters. The situation presented in FIG. 8 is not one-side saturation or two-side saturation. According to the method presented in FIG. 5, a narrow dynamic range is detected since high-saturation threshold is located between low desired sensitivity area (805 of FIG. 8) and high desired sensitivity area (806 of FIG. 8). As shown in FIG. 9A, the distance 901 between calculated high-saturation threshold 702 and calculated low-clipping threshold 701 is bigger than the original distance 902 between calculated high-saturation threshold 702 and calculated low-clipping threshold 701, shown in FIG. 8. The distance between the clipping thresholds may be increased by increasing the visual parameter of the contrast a plurality of iterations as described at box 560 of FIG. 5. The situation presented in FIG. 9A may not be sufficient since the frame may be perceived as too dark to a human eye because both clipping thresholds are located outside the desired sensitivity area. When a situation as presented in FIG. 9A is detected, the method may detect at box 535, one-side saturation and may increase the visual parameter of the brightness in a plurality of iterations.

As shown by FIG. 9B, increasing in a plurality of times or iterations the brightness parameter may shift the low-clipping threshold into the low sensitivity area and the high-saturation threshold into the high-sensitivity area without changing the distance between them. Such a situation may improve a frame perception by a user.

Reference is made back to FIG. 5. If the path that does not require any update of the visual parameters is chosen, namely the path including boxes 535, 545 and 555, the method may include keeping or maintaining the same visual parameters and increasing the window size, namely parameter N, as indicated at box 565. As updating the visual parameters of the capturing device frequently may cause flickering or artifacts to the viewer, the method may include decreasing the frequency of updating the visual parameters by increasing the window size and increasing parameter N up to a predefined limit of P*N times.

As indicated by arrow 590, the method may include going back to receive another frame and start another iteration again from box 501 after increasing window N. The method may include going back to box 500, to change and reset one or more parameters and/or user preferences before receiving a new frame at box 500 as indicated by dashed arrow 590.

If one of the paths that include an update of the visual parameters is chosen, namely one of the paths including one of boxes 540, 550 or 560, the method may include increasing the frequency of updating the visual parameters by decreasing window size, namely parameter N as indicated at box 570. Decreasing the window size may enable a faster update of the visual parameters and a faster converges to the desired dynamic range, e.g., desired clipping and saturation values.

As indicated at box 575, the method may include verifying if it is an update time, namely, is a current time is considered as time to transfer the updated visual parameters as shown for example by the full line arrows in FIG. 6. If it is not an update time, the method may include going back to receive another frame and start another iteration again (starting at box 501), or going back to change and reset one or more parameters and/or user preferences before receiving a new frame at box 500 as indicated by dashed arrow 590.

As indicated at box 580, if it is update time, the method may include transferring the updated visual parameters to the capturing device, for example, capturing device 101 of FIG. 1. After transferring the updated visual parameters to the capturing device, the method may include going back to receive another frame and start another iteration again from box 501, or going back to change and reset one or more parameters and/or user preferences before receiving a new frame at box 500 as indicated by dashed arrow 590.

Figure 10A:
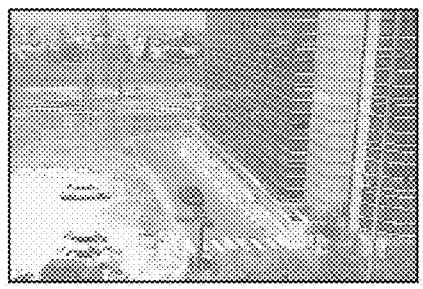
FIGS. 10A-10D are two flames and their respective histograms illustrating embodiments of the present invention.
Figure 10B:
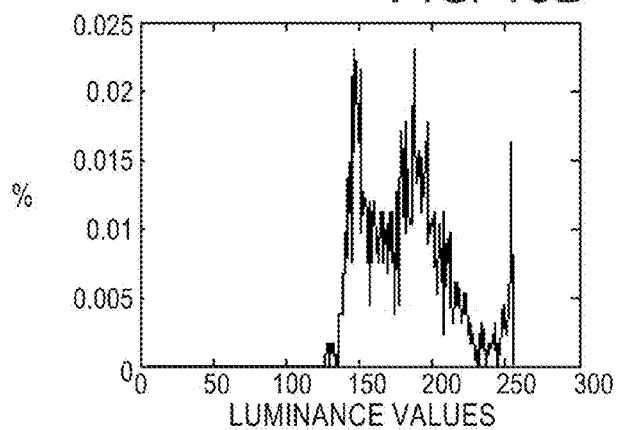
Figure 10:
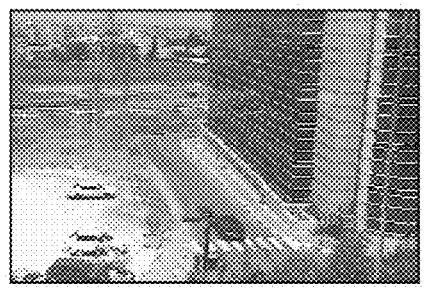
Figure 10D:
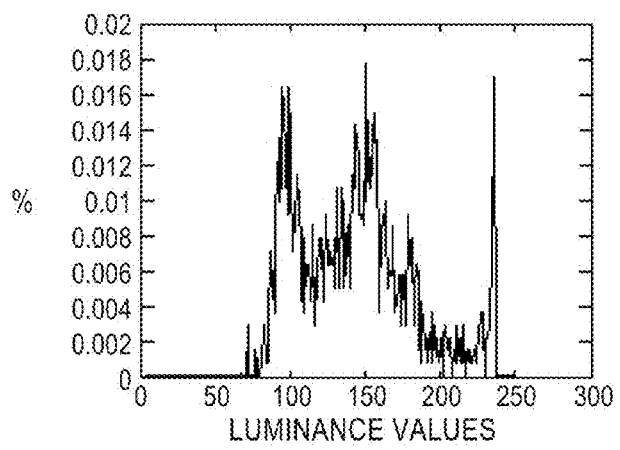

Reference is made now to FIGS. 10A-10D illustrating two frames and their respective histograms demonstrating embodiments of the present invention. FIG. 10A represents a received frame having a narrow dynamic range with relative high-brightness characteristics. FIG. 10B represents the respective histogram of the frame shown in FIG. 10A. According to embodiments of the present invention after receiving a plurality of frames and performing a plurality of iterations of updating visual characteristics as presented in FIG. 5, an output frame (FIG. 10C) may be generated. As shown by the respective histogram of FIG. 10D, the output frame may have a better video clarity with wider dynamic range and less saturated pixels which reveal more details to the human eye. The histograms of the input video frame (FIG. 10B) and of the output video frame (FIG. 10D) video frames demonstrate the increase in the width of the dynamic range due to increasing of the contrast parameter and further demonstrate the shift in brightness settings by centralizing the histogram to a middle value of the dynamic range.

According to embodiments of the present invention, automatic control over the visual parameters of the capturing device is provided by learning the scene characteristics performing decisions over time regarding the optimal visual parameters. Based on the processing results of a captured flame's histogram, the algorithm calculates the new visual parameters for the capturing device. According to some embodiments, the new visual parameters might include a minimal change from the original visual parameters and converge to the final preferred values slowly by performing several iterations while in other embodiments a leap to the final desired values within a single iteration.

Although the present invention is not limited in this respect, a-priori knowledge of the characteristics of the capturing device may be used and by predicting the required change of the visual parameters. Other embodiments may perform, on the fly, real-time changes while trying to converge to optimal desired visual parameters by trial and error.

The a-priori knowledge regarding the capturing device may be, for example, the transfer function of the capturing device. Such knowledge may include, for every input value, the output value and the influence of the visual parameters, e.g., brightness, contrast and color. This may be achieved by running an experiment with constant input value steps, e.g., from black to white pixel values and learning the influence of the visual parameters over the resulted captured digital values by formulation of the mapping of input luminance or color values to output luminance or color values as shown in FIG. 4. An example of a transfer function is presented in equation 2 below:

$$Y_{out} = \text{Int}\left[\frac{CONT}{128} * (Y_{in})\right] - CONT + BRIG \quad (2)$$

where "CONT" represents the contrast parameter and "BRIG" represents the brightness parameter. Yin and Yout are the input and output luminance values. The knowledge of the transfer function may enable latter on, according to a visual-parameter control method to get to the optimal image parameters and details in a single iteration.

According to other embodiments the calculation may not rely on a transfer function of the capturing device but rather may converge to the optimal video clarity and visual parameter values by a plurality of small-tep iterations and a feedback loop.

Figure 11:
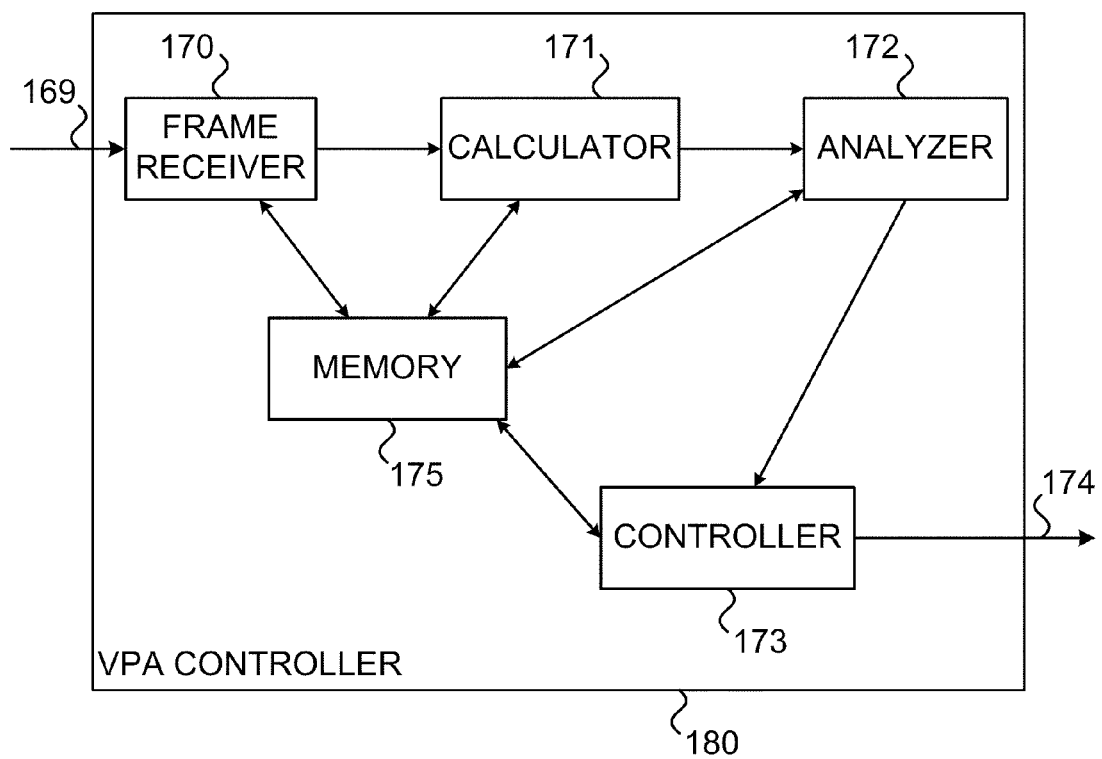
FIG. 11 is a block diagram of an exemplary visual-parameter automatic controller according to embodiments of the present invention.

Reference is FIG. 11 is a block diagram of an exemplary visual-parameter automatic (VPA) controller according to embodiments of the present invention. A VPA controller 180 may be, for example, VPA controller 102 of FIG. 1, VPA controller 202 of FIG. 2 or VPA controller 302 of FIG. 3. VPA controller 180 may be coupled to a capturing device, for example, capturing device 101 of FIG. 1, capturing device 201 of FIG. 2, capturing device 301 of FIG. 3 and may be implemented in any video related equipment, system, device, network or other video related communication system or architecture.

It should be understood to a person skilled in the art that a VPA controller, for example, VPA controller 180 of FIG. 11, may be implemented in any digital implementation such as, for example, digital signal processor (DSP), an application-specific integrated circuit (ASIC), a field-programmable gate array (FPGA) or any other general purpose devices. The VPA controller may be implemented in any other hardware, software or a combination of hardware and software implementations.

VPA controller 180 may include a frame receiver 170, a flame calculator 171, a frame analyzer 172 and a controller 173 all coupled to a memory unit 175. Frame receiver 170 may receive a frame of a video signal 169 captured and converted into a digital signal by one or more capturing devices such as analog-to-digital video converter, or directly from digital sensors, such as CCD or CMOS or any other frame detectors, for example, by capturing device 101 of FIG. 1. According to some embodiments, frame receiver 170 may also get digital video and may save it, or only the AOI's in memory 175. The received flames may be transferred to a frame calculator or a processor 171. Frame calculator or processor 171 may process the input frame or an area of interest (AOI) of a current input frame. Frame calculator 171 may perform mathematical calculations of pixel values of the current input frame and may store the results in memory 175. For example, frame calculator 171 may generate a histogram for the entire video frame or for an AOI of the frame as presented by equation number 1. Frame calculator 171 may further accumulate processing results of a current input frame to processing results of previous input flames, stored in memory 175, in order to average or smooth sharp transients or changes in scene characteristics, for example, dramatic changes in light such as turning lights on and off, clouds covering the sky and the like. During accumulating processing results, flame calculator 171 may accumulate the histogram calculated for the current frame or AOI to the histograms previously calculated for previous frames or AOI's.

Frame calculator 171 may further calculate a desired dynamic range based on user preferences and user pre-determined parameters, for example, stored in memory 175. For example, frame calculator 171 may calculate the desired dynamic range by calculating a low-clipping threshold and a high-saturation threshold, both may be calculated based on user preferences defining the percentage of the upper and lower luminance levels that may be cut out of the processing results, e.g., from the accumulated histogram. All calculated values may be transferred to analyzer 172.

Analyzer 172 may check if the accumulated results are in the desired dynamic range. Analyzer may check if the calculated clipping thresholds, for example, thresholds 701 and 702, of FIG. 7 are located inside or outside of the low dynamic range area 805 (of FIG. 8) and high dynamic range area 806 (of FIG. 8), respectively. Analyzer 172 may identify the location of the calculated low-clipping threshold relative to the low desired sensitivity area and the location of the calculated high-saturation threshold relative to the high desired sensitivity area. For example, Analyzer 172 may detect one of three situations: "one-side saturation", "two-side saturation" and "narrow dynamic range".

Analyzer 172 may detect one-side saturation, if the low-clipping threshold calculated on the accumulated results (701 of FIG. 8) is lower than the minimum value of the dynamic range (801 of FIG. 8) or if the high-saturation threshold calculated on the accumulated results (702 of FIG. 8) is higher than the maximum value of the dynamic range (802 of FIG. 8).

Analyzer 172 may detect two-side saturation, if both the low-clipping threshold calculated on the accumulated results (701 of FIG. 8) is lower than the minimum value of the dynamic range (801 of FIG. 8) and the high-saturation threshold calculated on the accumulated results (702 of FIG. 8) is higher than the maximum value of the dynamic range (802 of FIG. 8).

Analyzer 172 may detect narrow dynamic range and no saturation, if at least one of the clipping thresholds is located between low dynamic range area (805 of FIG. 8) and high dynamic range area (806 of FIG. 8). Analyzer 172 may transfer the analysis results to controller 173 which may determine regarding the required change or update of the visual parameters and may transfer the updated visual parameters to the capturing device, e.g., capturing device 201 of FIG. 2.

Controller 173 may receive the analysis results from analyzer 172 and may determine based on the results. For example, if a one-side saturation is detected, controller 173 may change or update a first predetermined visual parameter, for example, the brightness parameter. If a two-side saturation is detected, controller 173 may change or update a second predetermined visual parameter. For example, the method may include reducing of the contrast parameter. If a narrow dynamic range is detected, controller 173 may change or update a second predetermined visual parameter. For example, the method may include increasing of the contrast parameter.

Controller 173 may decide to keep the same visual parameters if no change is required and to increase the window size, namely parameter N, thereby to decrease the frequency of updating the visual parameters so as to reduce flickering or artifacts to the viewer. Controller 173 may decide to update the visual parameters and to decrease window size, namely parameter N, thereby to increase the frequency of updating the visual parameters so as to enable a faster converges to the desired dynamic range Controller 173 may further verify if it is an update time, namely, is a current time is considered as time to transfer the updated visual parameters as shown for example by the full line arrows in FIG. 6. If it is not an update time, the method may include going back to receiving another frame by frame receiver 170 and if it is an update time, controller 173 may transfer the updated visual parameters 174 to the capturing device, for example, capturing device 101 of FIG. 1.

Embodiments of the invention may include components such as, but not limited to, a plurality of central processing units (CPU), an embedded system, a general purpose processor (GPP) or any other suitable multi-purpose or specific processors or controllers, a plurality of input units, a plurality of output units, a plurality of memory units, and a plurality of storage units. Such system may additionally include other suitable hardware components and/or software components. In some embodiments, such system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

While certain features of the invention have been illustrated and described herein, many modifications, substitutions, changes, and equivalents will now occur to those of ordinary skill in the art. It is, therefore, to be understood that the appended claims are intended to cove all such modifications and changes as fall within the true spirit of the invention.

What is claimed is:

1. A method for processing video signals comprising:
   processing pixel values for a current input frame of a received video signal, wherein the signal is captured by a capturing device;
   generating an accumulated histogram using the pixel values of the current frame together with pixel values of one or more previous input frames;
   calculating a calculated low-clipping threshold and a calculated high-saturation threshold based on the accumulated histogram and according to predetermined parameters for a threshold calculation;
   calculating a desired dynamic range based on predetermined user parameters for a dynamic range calculation and determining a desired low sensitivity area and a desired high sensitivity area;
   checking if the accumulated histogram is within the desired dynamic range and determining if adjustment is desired by identifying a location of the calculated low-clipping threshold relative to the desired low sensitivity area and a location of the calculated high-saturation threshold relative to the desired high sensitivity area;
   adjusting visual parameters for a following input frame by controlling the capturing device if the accumulated histogram is not within the desired dynamic range; and
   maintaining current visual parameters for the following input frame if the accumulated histogram is within the desired dynamic range.

2. The method of claim 1, further comprising:
   setting the predetermined parameters prior to processing pixel values of the current input frame of the received video signal.

3. The method of claim 1, further comprising:
   determining whether a scene had changed between the current frame and a previous frame and performing a reset operation.

4. The method of claim 1, wherein adjusting the visual parameters for the following input frame comprises updating the visual parameters of the capturing device.

5. The method of claim 1, wherein adjusting the visual parameters for the following input frame comprises increasing the frequency of updating the visual parameters of the capturing device.

6. The method of claim 1, wherein maintaining the current visual parameters for the following input frame comprises decreasing the frequency of updating the visual parameters.

7. A system for video signal processing comprising:
   a capturing device to capture a current input frame of a video signal;
   a frame receiver to receive a digital representation of the current input frame from the capturing device;
   a frame calculator to process pixel values of the current input frame and to generate an accumulated histogram for the pixel values of the current frame together with pixel values of one or more previous input frames;
   a frame analyzer to calculate a desired dynamic range and to determine a desired low-sensitivity area and a desired high-sensitivity area based on pre-determined user parameters for dynamic range calculation, to calculate a calculated low-clipping threshold and a calculated high-saturation threshold based on the accumulated histogram and according to predetermined parameters for a threshold calculation and to check if the accumulated histogram is within the desired dynamic range by identifying a location of the calculated low-clipping threshold relative to the low-sensitivity area and the location of the calculated high-saturation threshold relative to the high-sensitivity area; and
   a controller to determined if adjustment is desired, to adjust visual parameters for a following input frame by controlling the capturing device if the accumulated histogram is not within the desired dynamic range and to maintain current visual parameters for the following input frame if the accumulated histogram is within the desired dynamic range.

8. The system of claim 7, further comprising:
   a memory unit to store the predetermined parameters.

9. The system of claim 7, wherein the controller is to update the visual parameters of the capturing device for capturing the following input frame if the accumulated histogram is not in a desired sensitivity range.

10. The system of claim 9, wherein the controller is to increase the frequency of updating the visual parameters.

11. The system of claim 7, wherein the controller is to maintain the current visual parameters of the capturing device for capturing the following input frame and to decrease the frequency of updating the visual parameters if the accumulated histogram is in a desired sensitivity area.

12. An article comprising a non-transitory computer-storage medium having stored thereon instructions that, when executed by a processing platform, result in:
   processing pixel values for a current input frame of a received video signal, wherein the signal is captured by a capturing device;
   generating an accumulated histogram using the pixel values of the current frame and pixel values of one or more previous input frames;
   calculating a calculated low-clipping threshold and a calculated high-saturation threshold based on the accumulated histogram and according to predetermined parameters for a threshold calculation;
   calculating a desired dynamic range based on predetermined user parameters for a dynamic range calculation and determining a desired low sensitivity area and a desired high sensitivity area;

checking if the accumulated histogram is within the desired dynamic range and determining if adjustment is desired by identifying a location of the calculated low-clipping threshold relative to the desired low sensitivity area and a location of the calculated high-saturation threshold relative to the desired high sensitivity area;

adjusting visual parameters for a following input frame by controlling the capturing device if the accumulated histogram is not within the desired dynamic range; and maintaining current visual parameters for the following input frame if the accumulated histogram is within the desired dynamic range.

* * * * *